United States Patent [19]

Hurten et al.

[11] Patent Number: 4,682,812

[45] Date of Patent: Jul. 28, 1987

[54] MOTOR VEHICLE BODY SIDE WALL

[75] Inventors: Oskar Hurten, Cologne; Hans Vogt, Overath; Paul Stutenkemper, Pulheim, all of Fed. Rep. of Germany

[73] Assignee: Ford Motor Company, Dearborn, Mich.

[21] Appl. No.: 873,037

[22] Filed: Jun. 11, 1986

[30] Foreign Application Priority Data

Jun. 15, 1985 [DE] Fed. Rep. of Germany ....... 3521607

[51] Int. Cl.⁴ .............................................. B62D 25/08
[52] U.S. Cl. .................................... 296/195; 296/188; 296/209
[58] Field of Search ............... 296/195, 198, 202, 187, 296/188 X, 185, 189, 209 X

[56] References Cited

U.S. PATENT DOCUMENTS 4,471,992 9/1984 Matsuura et al. .................... 296/195

FOREIGN PATENT DOCUMENTS 2428477 1/1976 Fed. Rep. of Germany .
2432238 7/1980 Fed. Rep. of Germany .
2931467 10/1981 Fed. Rep. of Germany .
58-26678 2/1983 Japan .................................... 296/195

Primary Examiner—Robert R. Song
Attorney, Agent, or Firm—Daniel M. Stock; Clifford L. Sadler

[57] ABSTRACT

A body side wall for motor vehicles, in particular for passenger cars and station wagons, which includes a rear side door opening and a rear pillar formed adjacent the vehicle rear wheel opening from inner and outer panels of the side wall together with a reinforcement panel. The invention wall construction includes a one-piece reinforcement panel which is formed in a U-shape and is positioned adjacent the door opening extending from the roof frame along the rear pillar and the front part of the wheel housing, the reinforcement panel being connected to the side wall inner panel and the side wall outer panel to form a box support extending from the roof frame to the sill.

6 Claims, 8 Drawing Figures

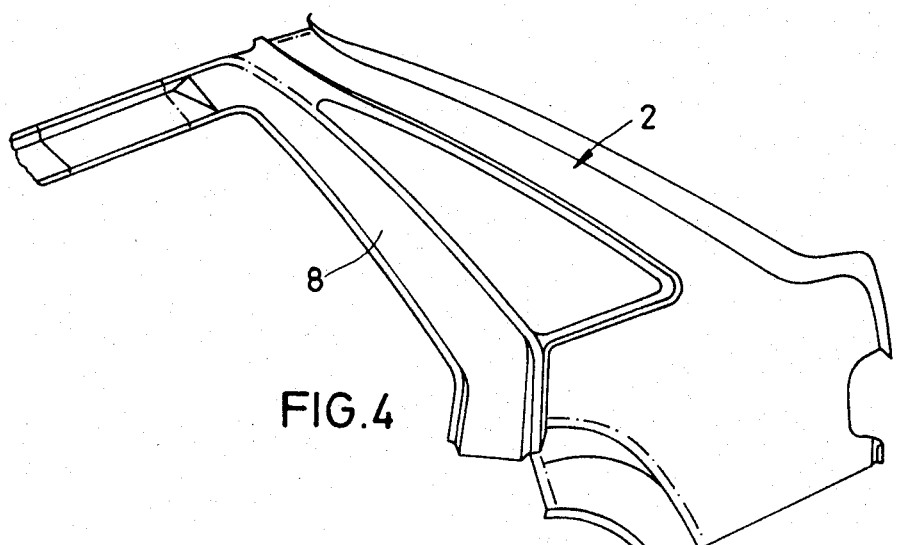
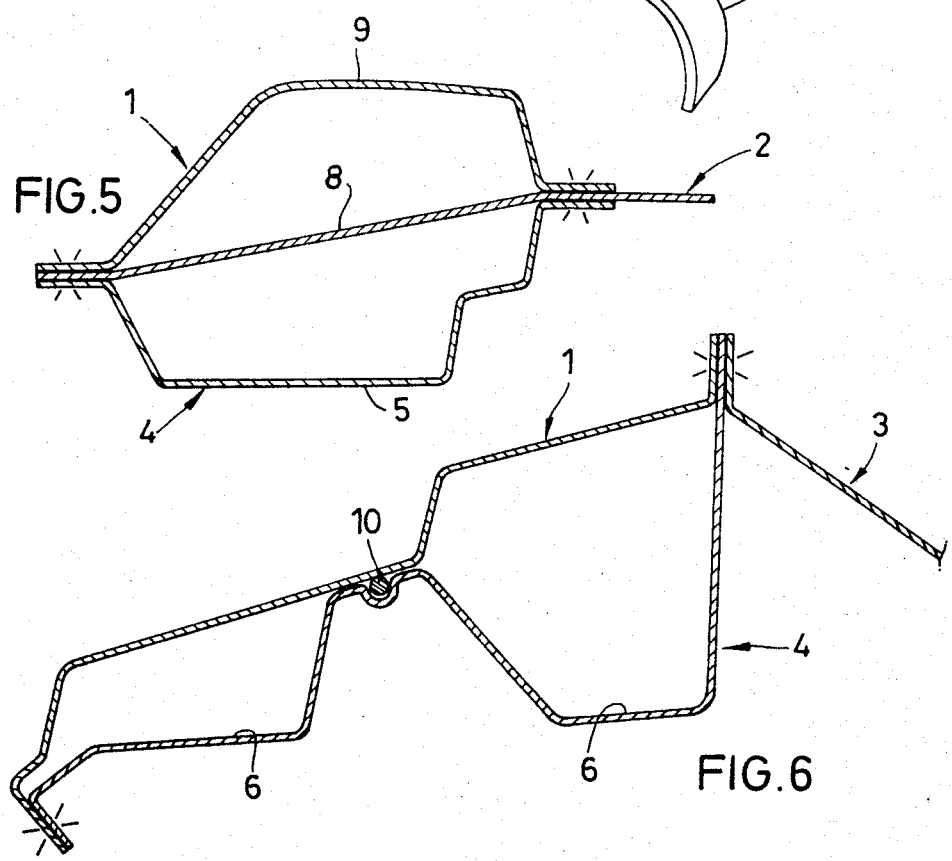

MOTOR VEHICLE BODY SIDE WALL

BACKGROUND OF THE INVENTION

1. Field of Invention

The invention relates generally to body side walls for motor vehicles and more particularly to the parts of body side walls of passenger cars and station wagons in the area of the rear side door opening.

2. Description of the Prior Art

A body side wall for motor vehicles of this type is known from the German Laid-Open Specification No. 24 28 477, in which a rear pillar is formed as a box support by joining a side wall inner panel and a side wall outer panel with an angular reinforcement panel. This box support is positioned adjacent to the front part of the wheel housing and is adapted to be connected to the longitudinal support of the body below the door entrance. The specification provides, however, no further details on the upper shape of the rear pillar or the front connection of the box support.

Another body side wall for motor vehicles is known from the German Published Specification No. 24 32 238, in which a U-shaped profiled reinforcement panel extends from the rear transverse support of the vehicle roof along the upper edge of the side wall inner panel and is then bent downwardly toward the rear part of the wheel housing and is welded essentially over its entire length to the side wall inner panel to form a box support. This arrangement of a reinforcement panel is intended to increase the energy absorption of the body structure in the event of a rear collision.

Another body side wall for motor vehicles is known from the German Pat. No. 29 31 467, in which a reinforcement panel, which is formed in a U-shape and which is supported at its lower end on the arch of the wheel housing, is disposed between a side wall inner panel forming a rear pillar and a side wall outer panel. An improved transverse rigidity of the bodywork is to be achieved by virtue of this reinforcement panel.

In the case of the last two known body side walls, the strength arising from the chosen design in the region of the rear side door opening is not substantially considered, since the designs are intended for motor vehicles in which a considerable rear body overhang makes an adequate strain path available in the event of a rear collision.

SUMMARY OF THE INVENTION

The object of the invention is to increase the strength arising from the chosen design in the region of the rear side door opening of a motor vehicle in which a rear pillar is formed as a box support by joining an inner and outer body panel through a reinforcement panel by providing a single reinforcement panel in such a way that in the event of a rear collision, despite a short rear overhang, the area of the body adjacent the rear side door opening does not undergo deformations which would adversely affect the opening of the vehicle door after the collision.

This object is attained according to the invention in that a one-piece reinforcement panel is provided which is formed in a U-shaped cross-section. It is positioned adjacent the door opening and extends from the vehicle roof along the door opening and extends from the vehicle roof along the rear pillar and the front of the wheel housing to the door sill, being connected to inner and outer side wall panels to form a continuous box support.

By virtue of the fact that a reinforcement panel, which is formed in a U-shape and is adjacent to the door opening starting from the roof frame and extending by way of the rear pillar and the front part of the wheel housing, is connected to the side wall inner panel and the side wall outer panel while forming a continuous box support extending from the roof frame to the sill, the chosen design produces strength in the region of the door opening such as cannot otherwise be achieved or can be achieved only with a substantial outlay in terms of weight with known box supports comprising partial reinforcement panels.

By virtue of the fact that in the region of the rear pillar the one-piece reinforcement panel together with the side wall outer panel and the side wall inner panel forms a box support comprising a diagonal web, a very strong and compact rear pillar is provided.

By virtue of the fact that in the region of the front part of the wheel housing the one-piece reinforcement panel together with the side wall outer panel forms two box supports extending in parallel fashion, a strength arising from the chosen design which substantially avoids a deformation of the door opening as the result of an accident, is achieved in this curved region of the vehicle body.

BRIEF DESCRIPTION OF THE DRAWINGS

The invention is described in greater detail in the following specification with reference to an embodiment illustrated in the accompanying drawings, in which:

FIG. 4 is an interior view of the side wall inner panel;

FIG. 5 is a section along the line V—V in FIG. 1;

Fig. 6 is a section along the line VI—VI in FIG. 1;

DESCRIPTION OF A PREFERRED EMBODIMENT

Figure 1:
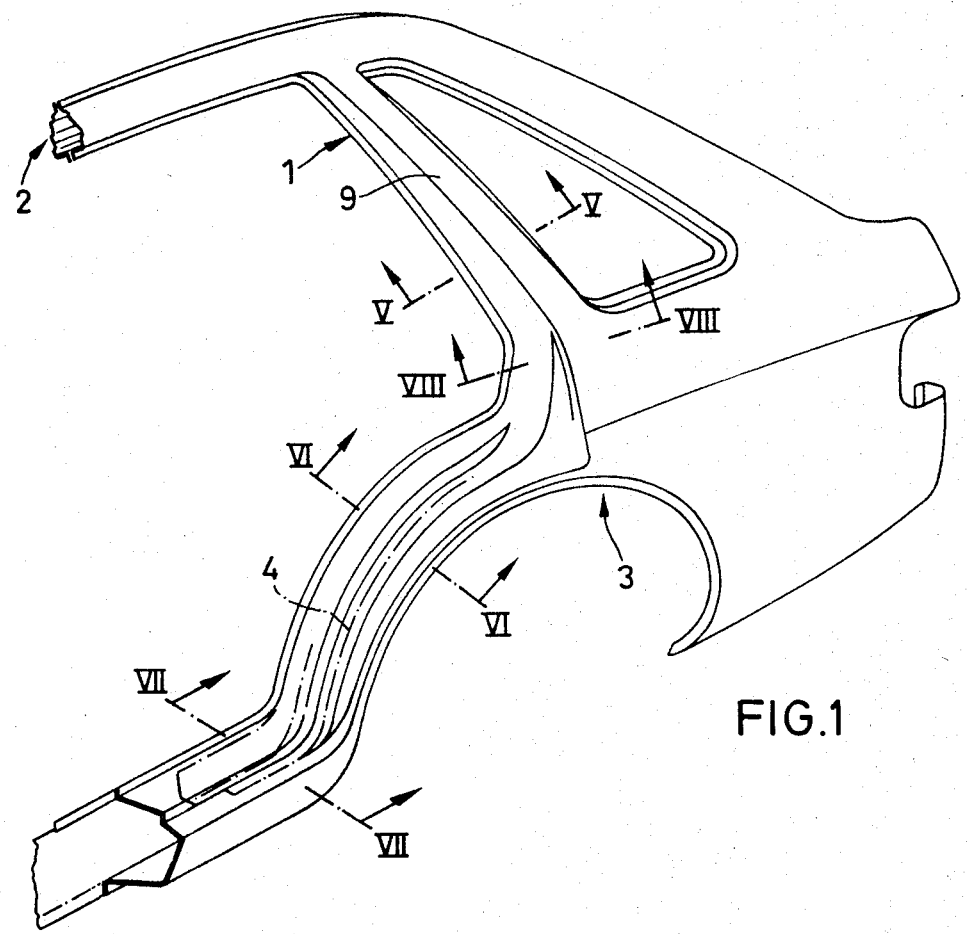
FIG. 1 is a partial view of a body side wall according to the invention with the portions of the reinforcement panel indicated in dash-dot lines.

As shown in FIG. 1, a body side wall for a motor vehicle essentially comprises a side wall outer panel 1, a side wall inner panel 2, a wheel housing 3 and a U-shaped profiled one-piece reinforcement panel 4.

Figure 2:
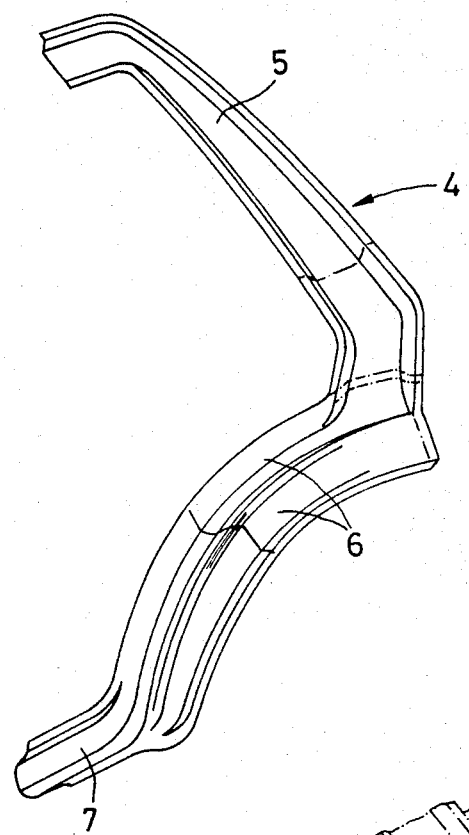
FIG. 2 is a side view of the one-piece reinforcement panel according to the invention.

As shown in FIGS. 2 and 5, the upper part of the one-piece reinforcement panel 4 has a U-shaped cross-section 5 which is open toward the outside and which has angled welded flanges. In its lower part adjacent to the wheel housing 3 the one-piece reinforcement panel 4 comprises, as may best be seen in FIG. 6, two U-shaped cross-sections 6 which extend in parallel fashion and which in the connection area of the sill pass into a horizontal portion with a V-shaped cross-section 7 and angled welded flanges, as may best be seen in FIG. 7.

Figure 3:
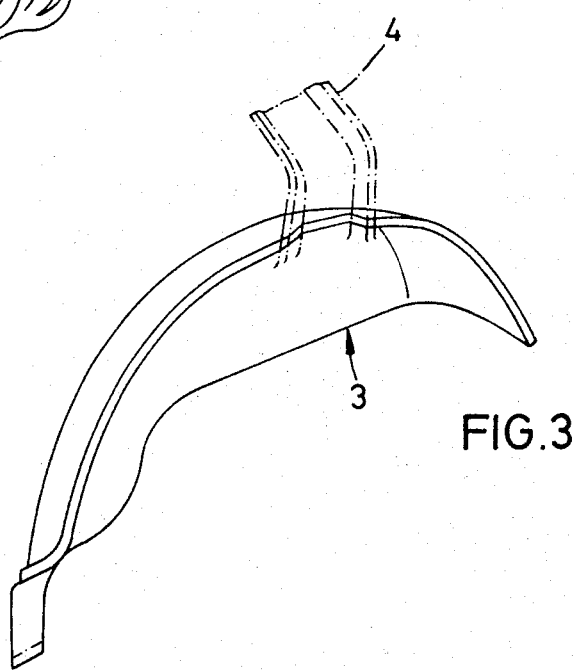
FIG. 3 is an elevation of the wheel housing showing the connection area of the reinforcement panel.

As shown in FIG. 3, the wheel housing 3 comprises only one inner wheel housing panel of conventional shape.

In FIG. 4, there is shown the shape of the side wall inner panel 2. In one region identified by the numeral 8, it forms part of the rear pillar. In this region 8, the inner panel 2 is made relatively level and flat in order to close a corresponding portion 9 of the side wall outer panel 1 which is formed in a U-shape, as may best be seen in FIG. 5. In this same region, the upper part 5 of the reinforcement panel 4, also formed to have a U-shaped cross-section, is joined in conventional manner by spot welding to this relatively level region 8 by way of flanged panels angled to engage the inner panel 2 as is shown in FIG. 5. The side wall outer panel 1, the side wall inner panel 2, and the reinforcement panel 4 thus form a rear pillar with a box-shaped supporting profile reinforced by a diagonal web (See FIG. 5).

As shown in FIG. 4, the level region 8 of the side wall inner panel 2 ends at the wheel housing 3, and the part of the reinforcement panel 4 having the two U-shaped cross sections 6 extending in parallel fashion is joined to the side wall outer panel 1 through corresponding flange areas by spot welding or through adhesion areas as indicated at 10 provided in the area between the outer panel and the reinforcement panel 4 (See FIG. 6).

Figure 7:
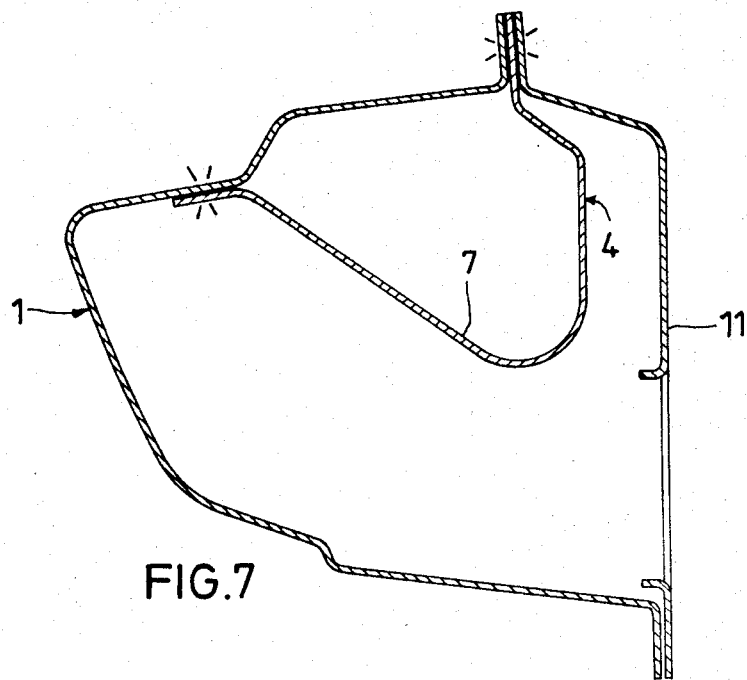
FIG. 7 is a section along the line VII—VII in FIG. 1.

Turning next to FIG. 7, the side wall outer panel 1 forms, together with a lower part of the reinforcement panel 4 having the V-shaped cross-section 7, a box support which extends into the region of the sill in a curved manner and extends a certain further distance in a direction parallel to a longitudinal side panel 11 of the floor pan structure of the body.

Figure 8:
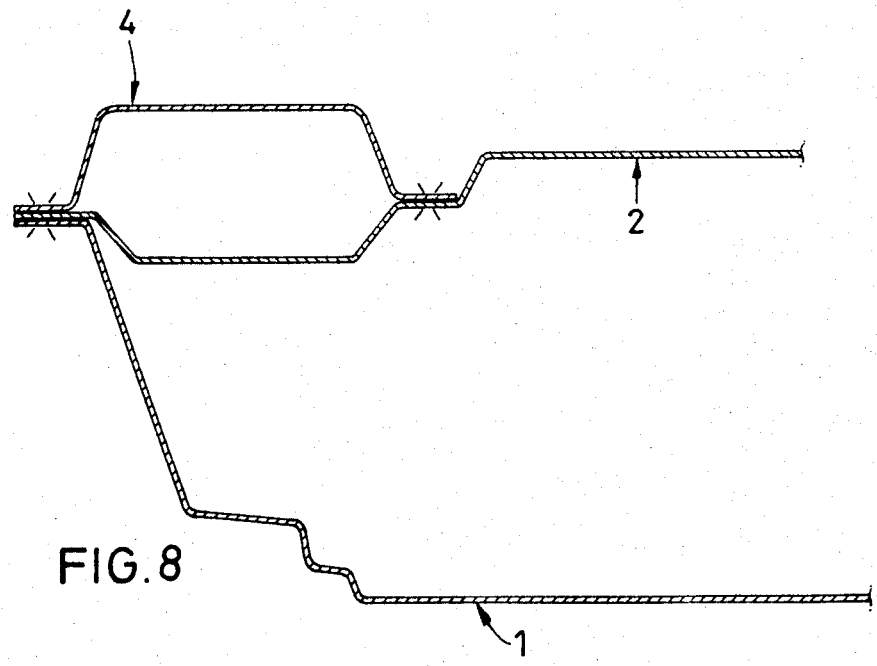
FIG. 8 is a section along the line VIII—VIII in FIG. 1.

Turning finally to FIG. 8, in the region of the belt line of the body, both the side wall inner panel 2 and the side wall outer panel 1 are simultaneously connected to the reinforcement panel 4 by spot welding.

While only one embodiment of the invention vehicle side wall construction has been described, others may be possible without departing from the scope of the appended claims.

We claim:

1. A body side wall for motor vehicles of the type including a rear side door opening bounded in part by the vehicle roof, the vehicle floor sill and a rear pillar which essentially comprises a side wall inner panel, a side wall outer panel, and reinforcement panel means defining a box support positioned adjacent the front part of the rear wheel housing, characterized in that the reinforcement panel means comprises a one-piece reinforcement panel formed to have a U-shaped cross-section and positioned adjacent the door opening, extending from the vehicle roof frame along the rear pillar and the front part of the wheel housing to the sill portion of the vehicle body floor, the reinforcement panel being connected to the side wall inner panel and the side wall outer panel to form a continuous box support extending from the roof frame to the sill; and that in the region of the front part of the wheel housing the one-piece reinforcement panel forms two box supports extending in parallel, partly curvilinear fashion along the periphery of the wheel housing through attachment to the side wall outer panel.

2. A body side wall according to claim 1 further characterized in that in the region of the rear pillar the one-piece reinforcement panel forms a box support comprising a diagonal web together with the side wall outer panel and the side wall inner panel.

3. A body side wall according to claim 2 further characterized in that in the region of the front part of the wheel housing the one piece reinforcement panel forms two box supports extending parallel, partly curvilinear fashion along the periphery of the wheel housing through attachment to the side wall outer panel.

4. A body side wall according to claim 1 further characterized in that in the region forward of the wheel housing the one-piece reinforcement panel is formed to define a V-shaped cross-section and is connected at one side to the side wall outer panel and at its other side between both another portion of the side wall outer panel and a portion of the vehicle floor sill to define a box support portion extending from the wheel housing forwardly along the sill.

5. A body side wall according to claim 2 further characterized in that in the region forward of the wheel housing the one-piece reinforcement panel is formed to define a V-shaped cross-section and is connected at one side to the side wall outer panel and at its other side between both another portion of the side wall outer panel and a portion of the vehicle floor sill to define a box support portion extending from the wheel housing forwardly along the sill.

6. A body side wall according to claim 3 further characterized in that in the region forward of the wheel housing the one-piece reinforcement panel is formed to define a V-shaped cross-section and is connected at one side to the side wall outer panel and at its other side between both another portion of the side wall outer panel and a portion of the vehicle floor sill to define a box support portion extending from the wheel housing forwardly along the sill.

* * * * *